(12) United States Patent
Lin (10) Patent No.: US 7,772,730 B2
(45) Date of Patent: Aug. 10, 2010

(54) MAGNETIC WHEEL

(75) Inventor: Hsien-Mo Lin, Taichung (TW)

(73) Assignee: Her Yuan Chyun Co., Ltd., Taichung (TW)

( * ) Notice: Subject to any disclaimer, the term of this patent is extended or adjusted under 35 U.S.C. 154(b) by 313 days.

(21) Appl. No.: 11/961,529

(22) Filed: Dec. 20, 2007

(65) Prior Publication Data

US 2009/0160273 A1 Jun. 25, 2009

(51) Int. Cl.
*H02K 7/02* (2006.01)

(52) U.S. Cl. .................. 310/74; 310/75 R; 310/76; 310/77; 310/93; 188/164; 188/325; 188/25

(58) Field of Classification Search .................. 310/74, 310/76, 77, 93; 188/25, 164, 325; *H02K 7/02*
See application file for complete search history.

(56) References Cited

U.S. PATENT DOCUMENTS

| | | | | | |
|---|---|---|---|---|---|
| 1,805,190 | A | * | 5/1931 | Semmes | 188/328 |
| 2,110,696 | A | * | 3/1938 | Boiarsky | 188/325 |
| 2,132,480 | A | * | 10/1938 | Karlak et al. | 188/325 |
| 4,059,779 | A | * | 11/1977 | Wistinghausen | 310/77 |
| 4,609,841 | A | * | 9/1986 | Masaki et al. | 310/75 R |
| 5,711,404 | A | * | 1/1998 | Lee | 188/164 |
| 6,119,822 | A | * | 9/2000 | Baldwin | 188/79.51 |
| 6,169,346 | B1 | * | 1/2001 | Nakamura et al. | 310/75 D |
| 6,360,855 | B1 | * | 3/2002 | Szu-Yin | 188/161 |
| 6,468,186 | B2 | * | 10/2002 | Lay | 482/63 |
| 6,585,087 | B2 | * | 7/2003 | Lin | 188/164 |
| 6,719,107 | B1 | * | 4/2004 | Chen | 188/164 |
| 7,018,324 | B1 | * | 3/2006 | Lin | 482/63 |
| 7,451,859 | B2 | * | 11/2008 | Yin | 188/267 |
| 2004/0046462 | A1 | * | 3/2004 | Chen | 310/20 |

* cited by examiner

*Primary Examiner*—Quyen Leung
*Assistant Examiner*—John K Kim
(74) *Attorney, Agent, or Firm*—Egbert Law Offices PLLC (57) ABSTRACT

The present invention provides a magnetic wheel including a foundation body, a cover body, a fly wheel, a central axis, a drive motor, a drive gear assembly and two magnetic control strips. The drive gear assembly is driven by an output axis of the drive motor, enabling the swinging of the gear wheel of two magnetic control strips. The drive gear assembly has a gearshift unit, a coupling element and rear gear. The axial direction of the coupling element and rear gear is the same as the central axis of the magnetic wheel. The gear wheel of two magnetic control strips is mated with the rear gear through spur gear, thus making it easier to improve the manufacturing precision and drive efficiency and also reduce the manufacturing cost for better economic efficiency.

6 Claims, 11 Drawing Sheets

MAGNETIC WHEEL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a magnetic wheel, and more particularly to an innovative magnetic wheel applied to a resistance control device on fitness equipment.

2. Description of Related Art Including Information Disclosed Under 37 CFR 1.97 and 37 CFR 1.98

The magnetic wheel is a resistance control device applicable to the fitness equipment.

Two control strips of the magnetic wheel are driven by a drive unit and a coupling element for swinging movement. The control strip is provided with a magnet opposite to a magnetic ring on the fly wheel. Thus, the resistance of the fly wheel can be adjusted by regulating the strength of a magnetic field through the swinging of the control strips.

Figure 5:
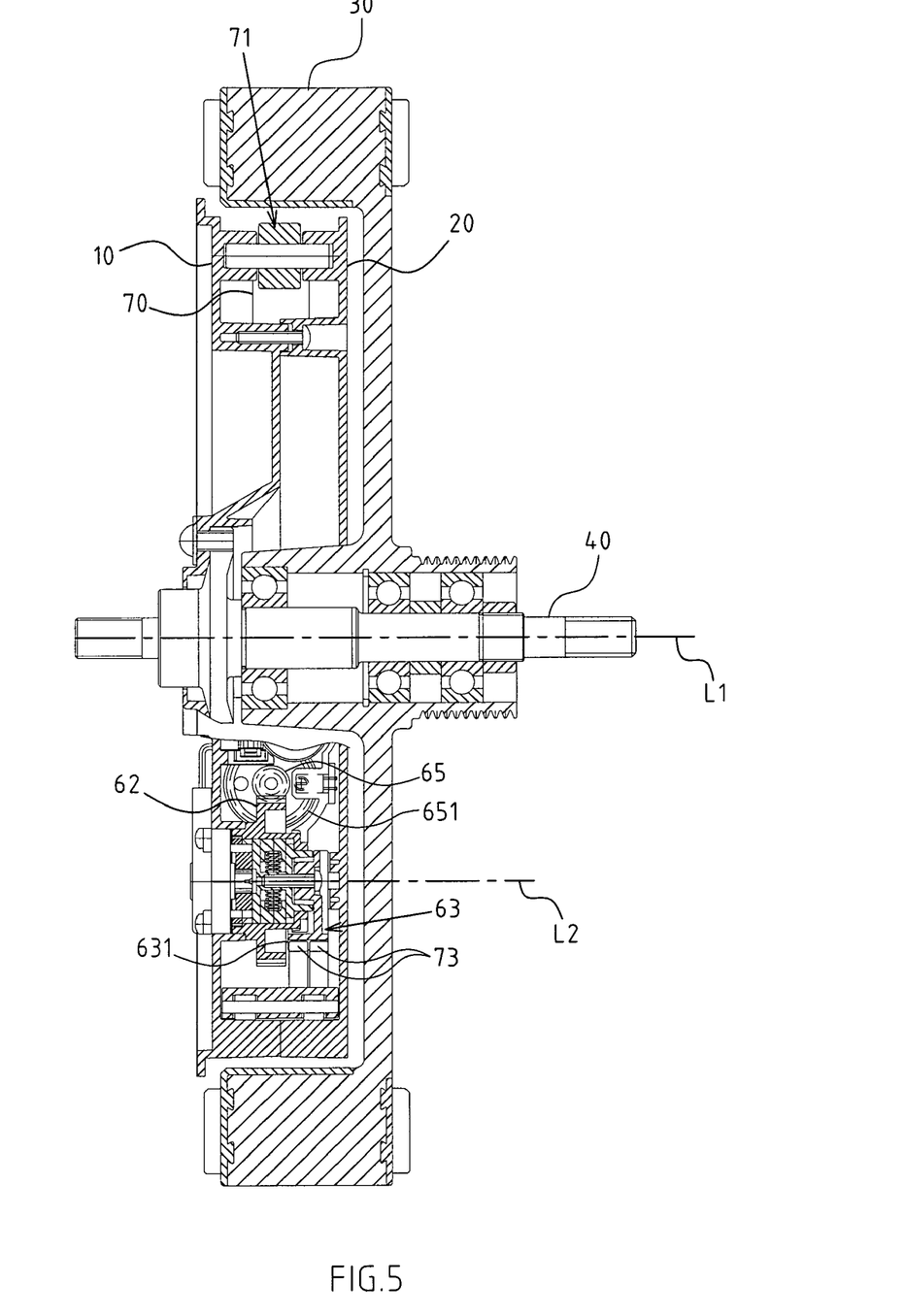
FIG. 5 shows an assembled sectional view of magnetic wheel structure of the present invention.
Figure 6:
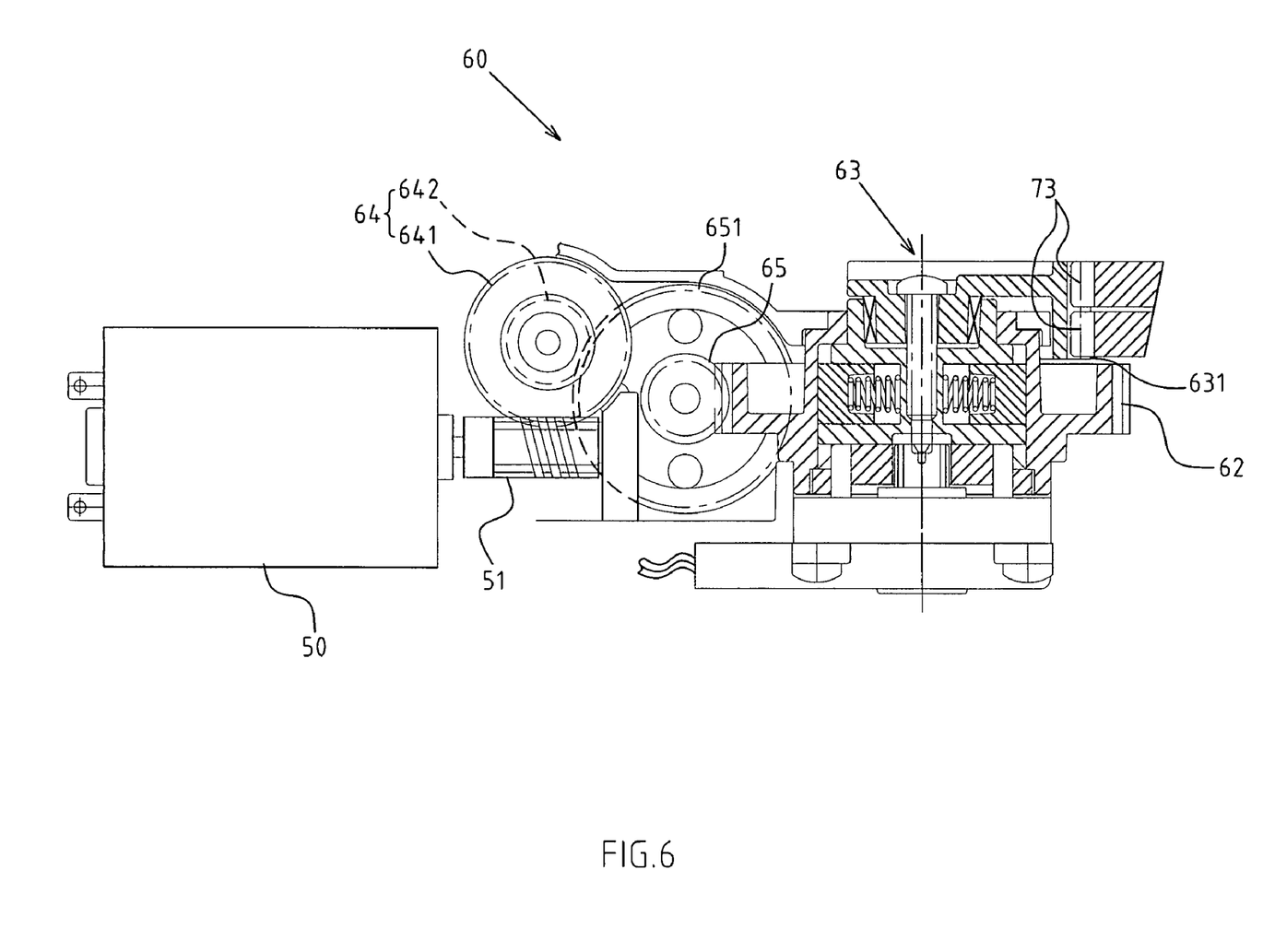
FIG. 6 shows a cross-sectional view of the assembled drive gear of the present invention.

As for the coupling element driving two control strips in a magnetic wheel structure, a gear assembly is generally used to drive the gear wheel opposite to two control strips. The present invention intends to make a breakthrough regarding the magnetic wheel structure driven by the gear. The prior art structure is shown in Taiwanese Patent No. 559082, entitled "Improved Control Structure of Magnetic Wheel". If the magnetic wheel is vertically fixed (the axis center of magnetic wheel being transverse as shown in FIGS. 5 and 6), then the coupling elements mated with the gear wheels of two control strips are axially erected, and the gear wheels of two control strips are arranged at front and rear sides of the coupling element. As the gear wheel shifts in a curve along with two swinging control strips, the coupling element and the gear wheel of the control strip must be formed into a tapered mating face.

The following shortcomings are observed during actual applications. First, as the coupling element and the gear wheel of the control strip are formed into a tapered mating face, the manufacturing cost of molds is relatively high. Moreover, the molding process and processing of components require extremely high precision for smooth engagement, leading to a sharp increase of manufacturing cost and poorer economy efficiency. Second, in a case where the coupling element is improperly mated with the gear wheel, some quality problems may occur, such as unstable mating and increased resistance. Third, even if the mating state of the coupling element and the tapered mating face of the gear wheel meets the required precision, axial thrust may occur (as for the coupling element), so the drive resistance between coupling element and the gearwheel of the control strip will increase, leading to reduction or loss of driving force.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

There are advantages of the present invention, as shown in FIGS. 1-6.

First, based on the axial direction of the rear gear 63 being the same with that of central axis 40, the spur gears are mated between the rear gear 63 and gear wheel 73 of the magnetic control strip 70. The precise coupling of the gears and gear wheels could be easily achieved through existing production technology, thus presenting lower defect rate and reducing greatly the manufacturing cost for better economic efficiency.

Second, as the magnetic wheel of the present invention allows for easy implementation of applications requiring high precision, as compared to the prior art tapered mating pattern, and bigger tolerance, the rear gear 63 can be mated with the gear wheel 73 more smoothly, improving greatly the motion performance.

Third, as the rear gear 63 is mated with the gear wheel 73 of the magnetic control strip 70 through spur gear, it is possible to avoid axial thrust and higher drive resistance of typical tapered mating face, eliminating the possible reduction or loss of drive force for improved drive performance of drive gear assembly.

Fourth, based on an elastic member 610 being arranged between an axial surface of gearshift unit 61 of the drive gear assembly 60 and a wear plate 12 in the space 11 of the foundation body 10, the gearshift unit 61 could be flexibly supported. When the output axis 51 of the drive motor 50 is stopped, the rotation inertia of the output axis 51 could be removed, so that the drive gear assembly 60 can be positioned accurately.

Fifth, based on the free end 72 of two magnetic control strips 70 being provided with roller 720, the free end 72 of the magnetic control strip 70 could swing more smoothly.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

FIGS. 1-4 depicts preferred embodiments of a magnetic wheel structure of the present invention. The embodiments are provided only for explanatory purposes with respect to the patent claims.

Figure 4:
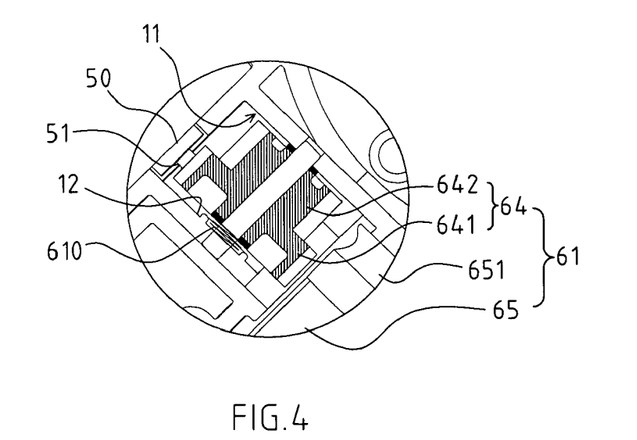
FIG. 4 shows a partial and enlarged sectional view of the present invention, wherein an elastic member is arranged between the gearshift unit and foundation body.

The magnetic wheel A comprises a foundation body 10, a cover body 20, a fly wheel 30, a central axis 40, a drive motor 50, a drive gear assembly 60 and two magnetic control strips 70. Two magnetic control strips are assembled onto the foundation body 10 via pinpoint 71, so that a free end 72 at bottom of two magnetic control strips 70 could swing. The foundation body 10 is provided with a space 11 for accommodating the drive motor 50 and drive gear assembly 60. The drive gear assembly 60 is driven by output axis 51 of the drive motor 50, enabling the swinging of gear wheel 73 at free end 72 of two magnetic control strips 70. The drive gear assembly 60 comprises a gearshift unit 61, a coupling element 62 and rear gear 63. Referring to FIG. 4, the axial direction (shown by centerline L2) of coupling element 62 and rear gear 63 is the same with that of central axis 40 of the magnetic wheel A (shown by centerline L1). The gear wheel 73 of two magnetic control strips 70 is mated with the rear gear 63 through spur gear.

Figure 2:
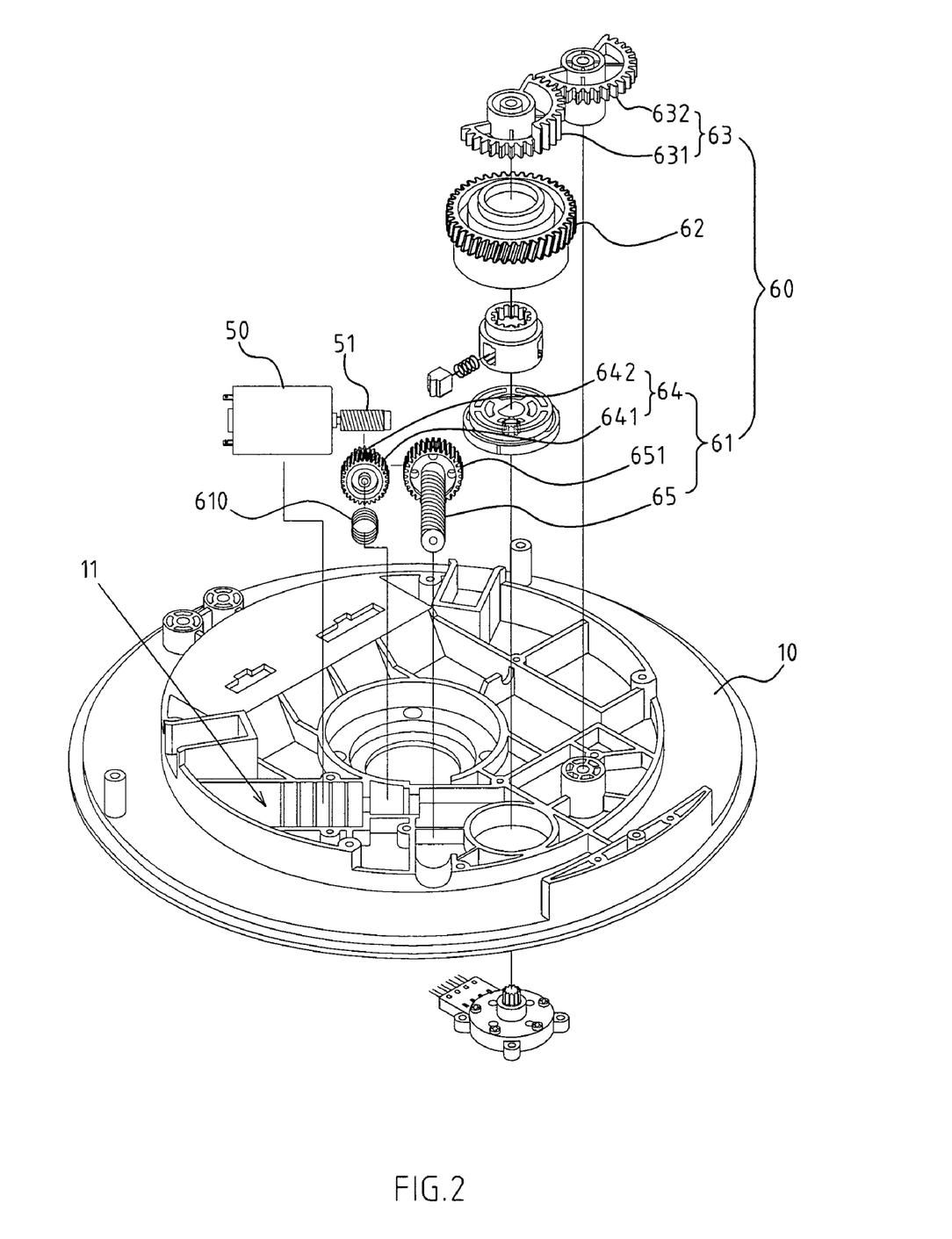
FIG. 2 shows a partially enlarged exploded perspective view of FIG. 1.
Figure 3:
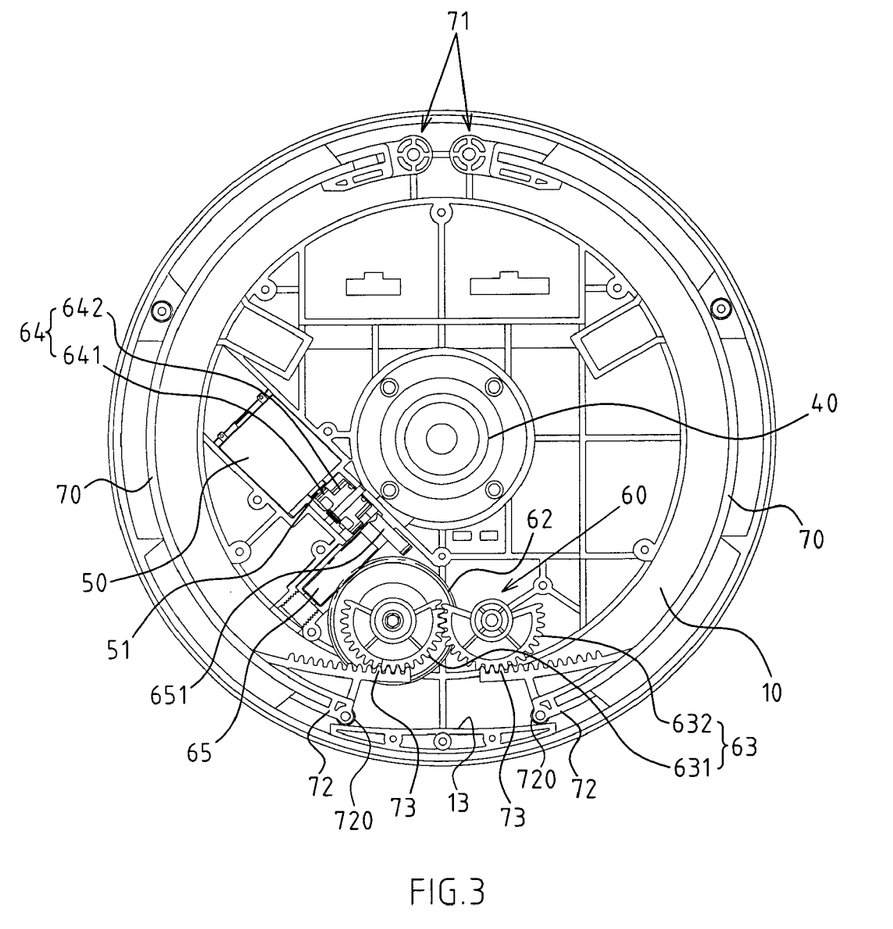
FIG. 3 shows an assembled top plan view of magnetic wheel of the present invention.

Referring to FIGS. 2, 3, and 5, the gearshift unit 61 comprises a step gear 64 and a worm 65, of which the step gear 64 is defined into a big gear portion 641 and a small gear portion 642. The output axis 51 of the drive motor 50 is provided with a threaded section 52 mating with big gear portion 641 of the step gear 64. One end of the worm 65 is provided with an expanded gear 651 mating with the small gear portion 642 of the step gear 64. The worm 65 is mated with the coupling element 62 of the drive gear assembly 60 (a gear in the preferred embodiment).

Referring to FIG. 4, an elastic member 610 (a spring) is arranged between an axial surface of gearshift unit 61 of the drive gear assembly 60 and a wear plate 12 in the space 11 of the foundation body 10. As illustrated in the preferred embodiment, the elastic member 610 is assembled between axial surface of big gear portion 641 on the step gear 64 of gearshift unit 61 and wear plate 12 in the space 11. With the use of elastic member 610, the step gear 64 is elastically supported. When the output axis 51 of the drive motor 50 is stopped, the rotation inertia of the output axis 51 could be removed, so that the drive gear assembly 60 can be positioned accurately.

Figure 1:
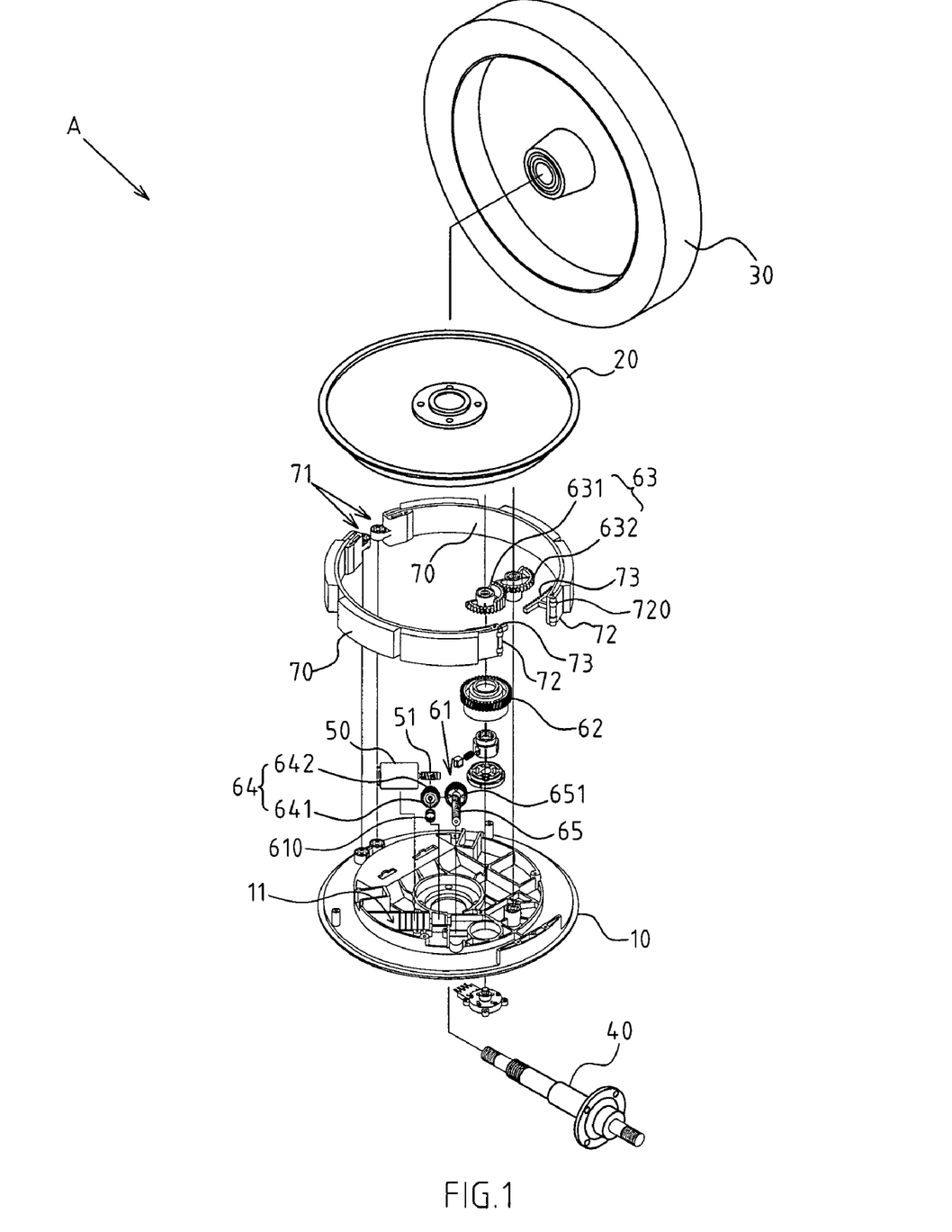
FIG. 1 shows an exploded perspective view of magnetic wheel of the present invention.

Referring to FIGS. 1, 2, and 3, said rear gear 63 is composed of left and right gears 631, 632, which are mated with each other for synchronous motion. The left gear 631 or right gear 632 is coupled axially with the coupling element 62 of the drive gear assembly 60, while the tip edge of left and right gears 631, 632 is separately mated with the gear wheel 73 at the free end 72 of the magnetic control strip 70.

Figure 7:
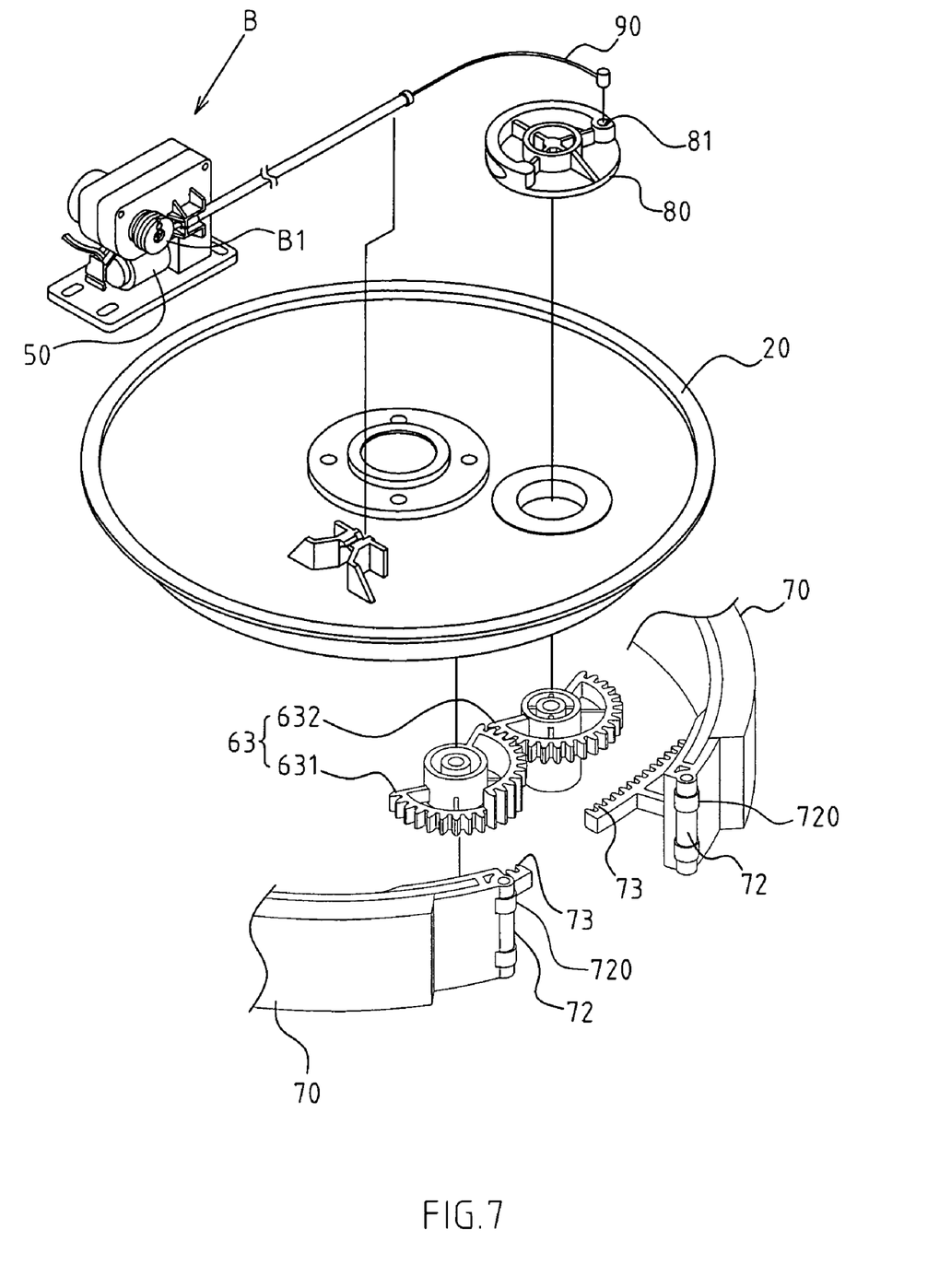
FIG. 7 shows an exploded perspective view of the present invention, wherein the coupling element is provided with a dragline drive seat.
Figure 8:
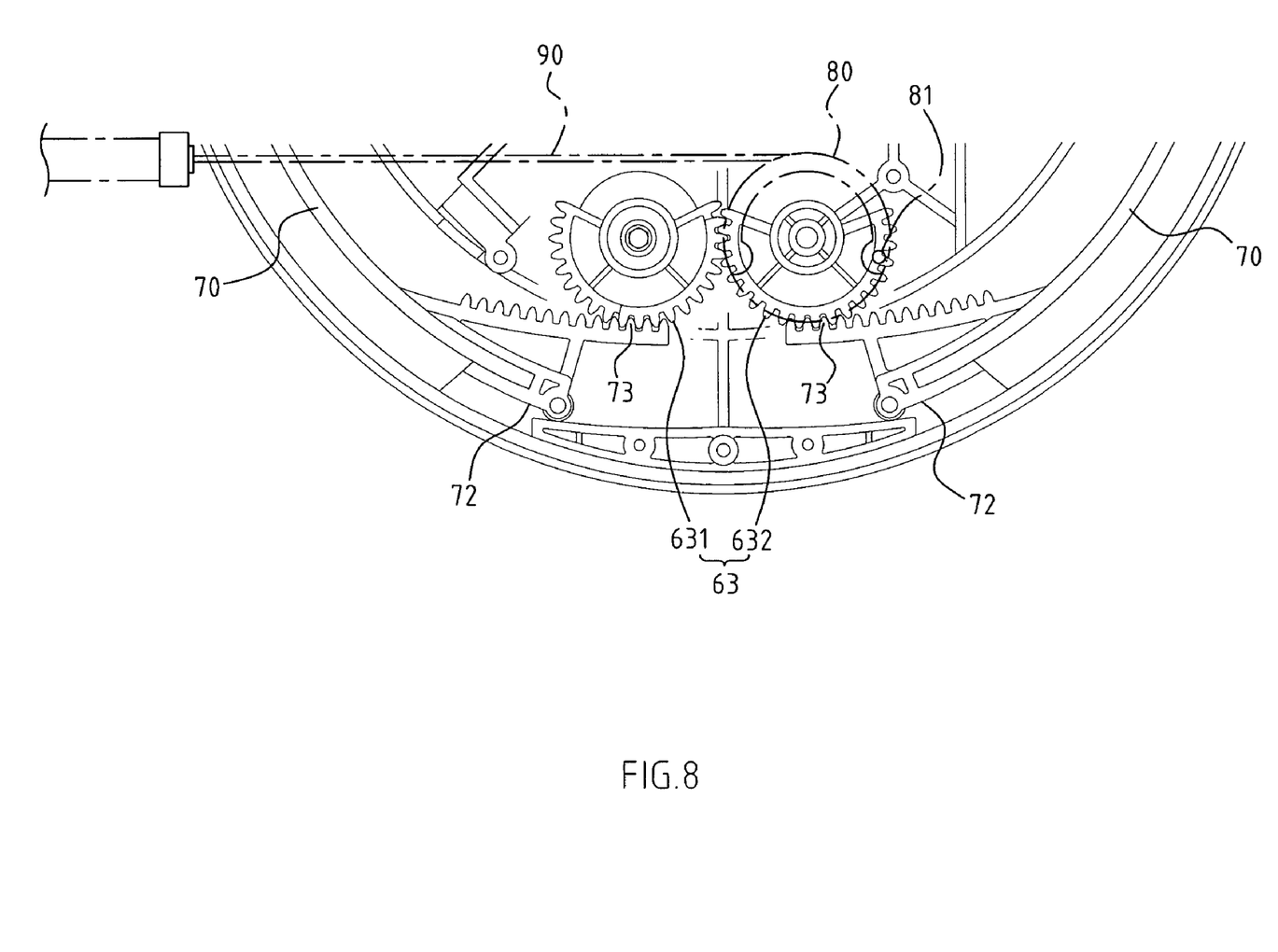
FIG. 8 shows an assembled top plan view of the preferred embodiment disclosed in FIG. 7.

As for magnetic wheel disclosed in FIGS. 1-5, the drive unit is of built-in shape, namely, the drive motor 50, gearshift unit 61 and coupling element 62 are assembled within the magnetic wheel. As for the external drive unit as shown in FIGS. 7 and 8, the drive motor 50 along with the drive gear assembly's gearshift unit 61 and coupling element 62 (refer to FIG. 2) can be integrated into an external drive module B, which is provided with a drive end B1 (a rotary wheel). A dragline drive seat 80 is placed at exterior of either left or right gear 631, 632. A dragline coupling portion 81 (e.g. snap slot) is positioned laterally onto the dragline drive seat 80 for linking the drive end of the external drive module via a dragline 90. The exterior of said dragline 90 is linked with the drive end B1 of external drive module B for the purpose of an external drive.

Figure 9:
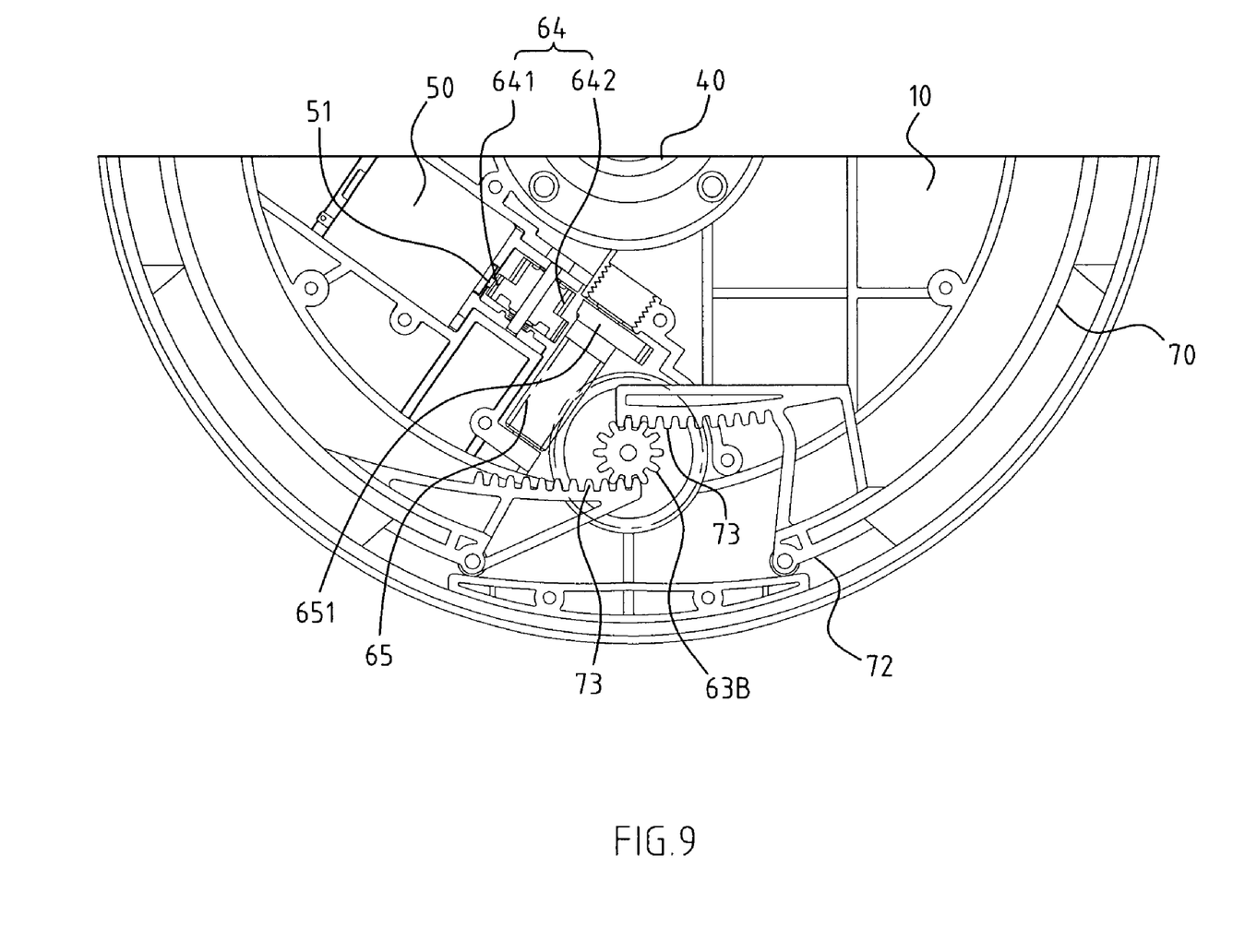
FIG. 9 shows a partial top plan view of an application of the magnetic control strip, which is provided with a gear wheel.

Referring to FIG. 9, said coupling element 63B is also composed of a single gear, so that the gear wheel 73 at free end 72 of two magnetic control strips 70 is mated with upper and lower sides of the rear gear 63B.

Referring to FIGS. 1 and 3, two magnetic control strips 70 are assembled at intervals onto pin joint 71 of the foundation body 10. Referring to FIG. 3, the pivot point formed by the pin joint 71, and the gear wheel 73 of magnetic control strip 70 are vertically aligned with the upper and lower mating positions of left and right gears 631, 632 for smooth engagement.

Referring also to FIG. 3, a roller 720 is assembled at the free end 72 of two magnetic control strips 70, then a track 13 is placed correspondingly to the foundation body 10 for the rolling of the roller 720, helping to reduce the frictional force arising from the swinging of the free end 72 of the magnetic control strip 70.

Figure 10:
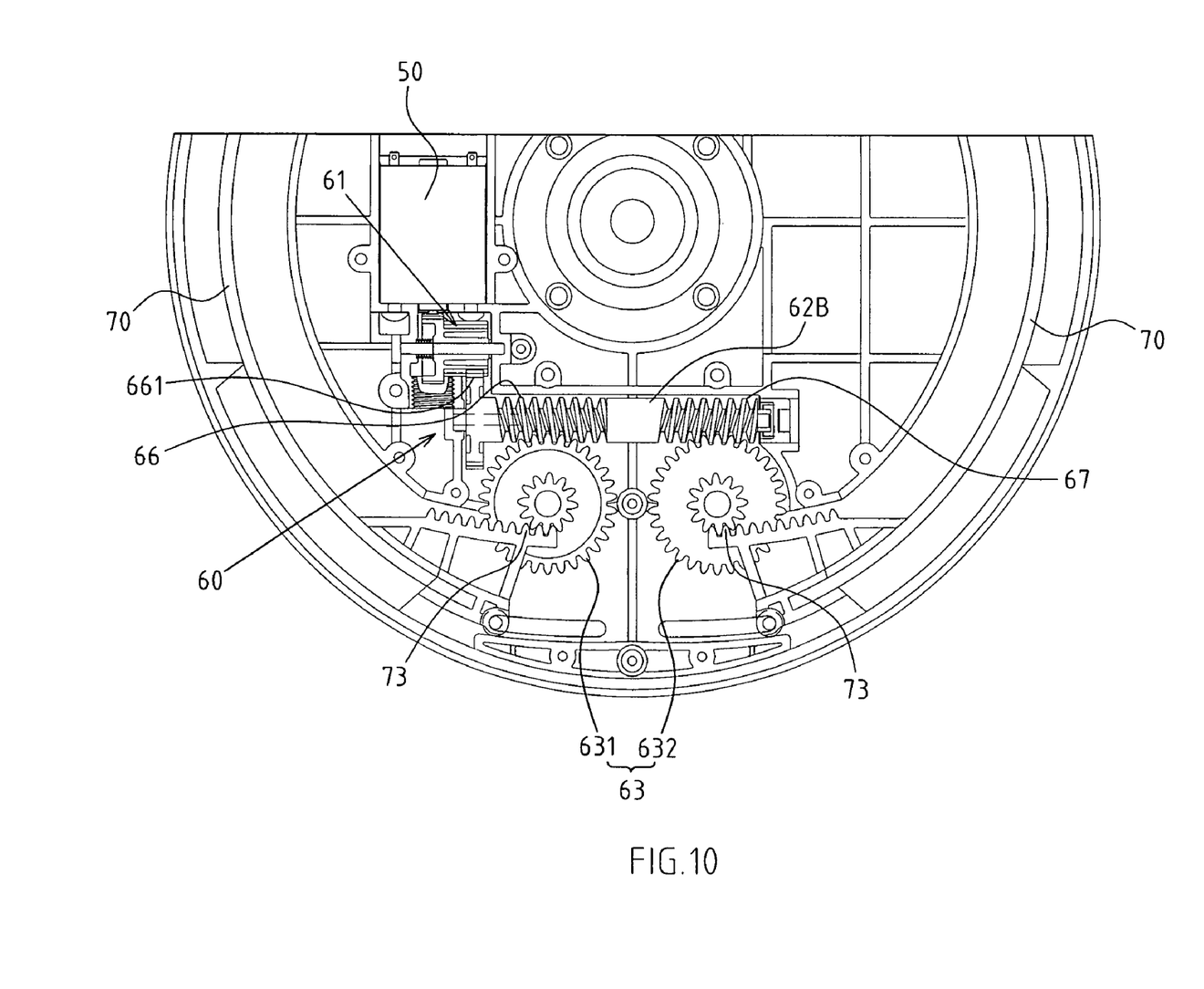
FIG. 10 shows another partial top plan view of the application of the drive gear assembly of the present invention.

FIG. 10 depicts another application view of the drive gear assembly 60 of the present invention, wherein the left and right gears 631, 632 are also mated with the gear wheel 73 of the magnetic control strip 70. The major difference is that the coupling element 62B is provided with double-thread worm, and that the both ends are fitted with the first threaded section 66 and second threaded section 67 of contrary rotation direction. At the end of the first threaded section 66, a gear portion 661 is mated with the gearshift unit 61. The first and second threaded sections 66, 67 are separately mated with the left and right gears 631, 632. Thus, when the coupling element 62B is driven by the gearshift unit 61, the first and second threaded sections 66, 67 will drive the left and right gears 631, 632 to generate contrary rotation, enabling the swinging of gear wheel 73 of the magnetic control strip 70.

Figure 11:
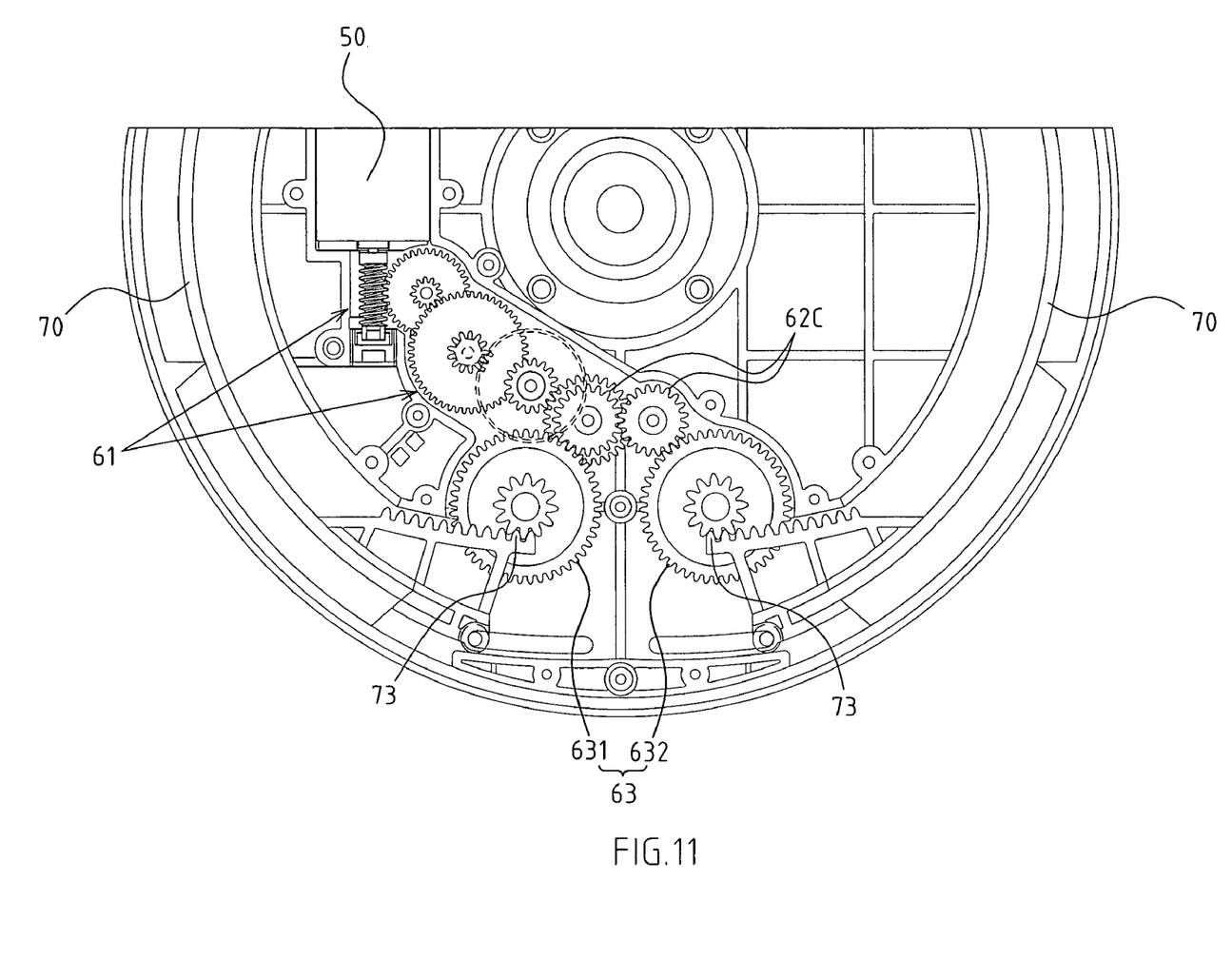
FIG. 11 shows another partial top plan view of the application of the drive gear assembly of the present invention.

FIG. 11 depicts another application view of the drive gear assembly 60 of the present invention. The major difference is that, the coupling element 62C is composed of two mated gears, of which one gear is mated with the gearshift unit 61, and these two gears are separately mated with left and right gears 631, 632. So, the left and right gears 631, 632 rotate reversely when two gears of the coupling element 62C rotate oppositely.

Figure 12:
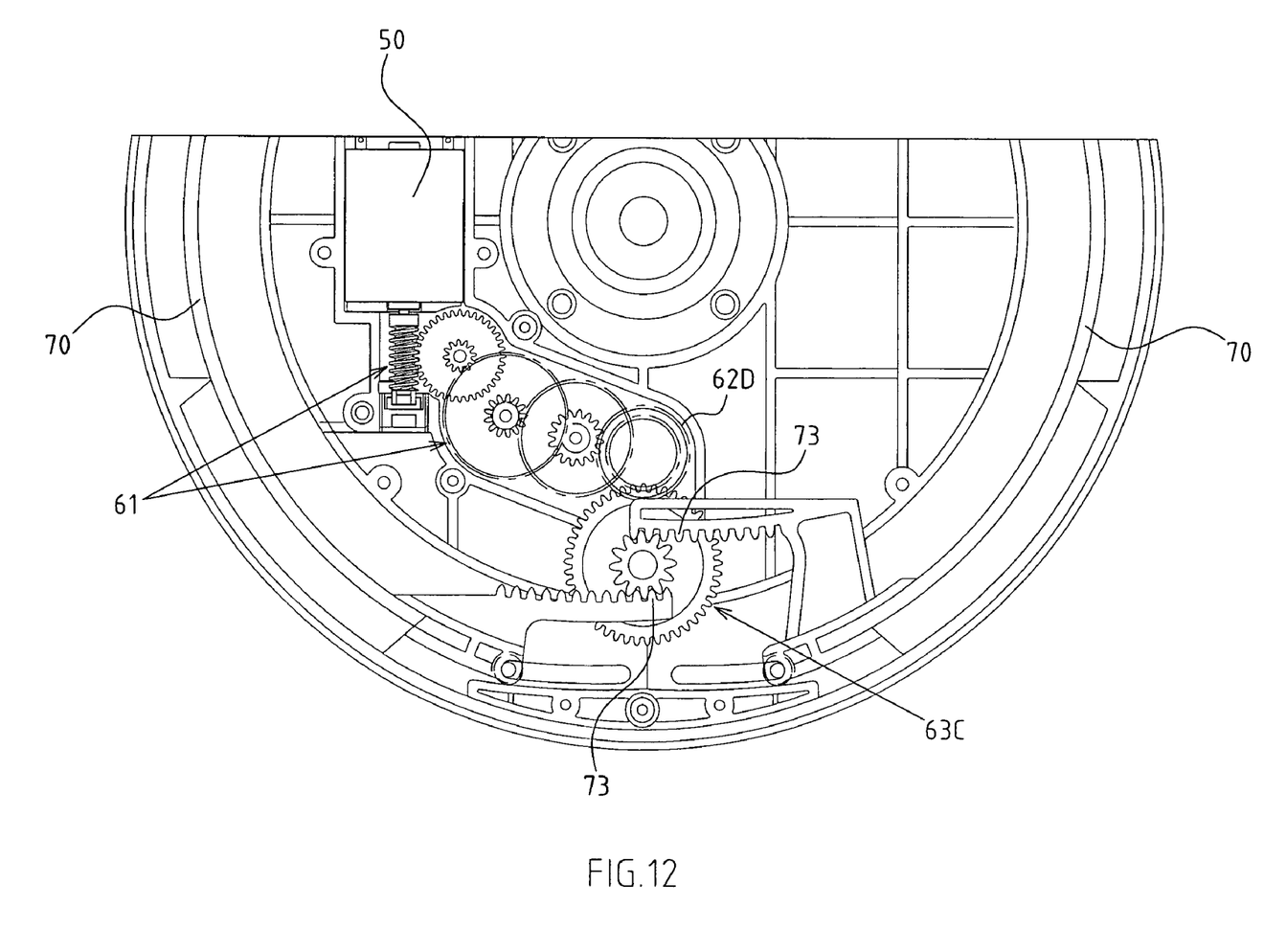
FIG. 12 shows another partial top plan view of the application of the drive gear assembly of the present invention.

FIG. 12 depicts another application view of the drive gear assembly 60 of the present invention. The major difference is that the coupling element 62D is mated with the rear gear 63C by means of single geared drive.

I claim:

1. A magnetic wheel assembly comprising:
   a foundation body having a space defined therein, said space having a wear plate therein;
   a cover body positioned over said foundation body;

a central axle extending through said foundation body and said cover;

a flywheel connected to said central axle and positioned over said cover body;

a drive motor having a drive shaft;

a drive gear assembly connected to said drive shaft so as to be driven by said drive motor, said drive gear assembly comprising:

- a gear shift unit having teeth engaged with said drive shaft, said gear shaft unit having a step gear having a first gear directly connected to an axially aligned second gear, said first gear having a diameter greater than a diameter of said second gear;
- a coupling element drivedly connected to said gear shift unit; and
- a rear gear engaged with said coupling element so as to be selectively driven by said coupling element, said coupling element and said rear gear being in a same axial direction as said central axle;

a pair of magnetic control strips assembled onto said foundation body, said pair of magnetic control strips being hingedly connected to each other at one end by a pin joint so as to allow opposite ends of said pair of magnetic control strips to swing relative to each other, said drive motor and said drive gear assembly received in said space of said foundation body, said opposite end of said pair of magnetic control strips each having a toothed member affixed thereto, the toothed members being engaged with said rear gear such that the opposite ends of said pair of magnetic control strips move relative to a rotation of said rear gear; and an elastic member bearing against a surface of said gear shift unit and against said wear plate.

2. The magnetic wheel assembly of claim 1, said gearshift unit having a worm, said drive shaft having a threaded section mated with said first gear of said step gear, said worm mated with said second gear of said step gear.

3. The magnetic wheel assembly of claim 1, said rear gear having a left gear and a right gear mated together, one of said left gear and said right gear axially coupled to said coupling element, said left gear mated with the toothed member at said opposite end of one of said pair of magnetic control strips, said right gear mated with the toothed member at said opposite end of the other of said pair of magnetic control strips.

4. The magnetic wheel assembly of claim 1, said rear gear being a single gear mated with the toothed member at the opposite ends of said pair of magnetic control strips.

5. The magnetic wheel assembly of claim 1, said coupling element being a gear.

6. The magnetic wheel assembly of claim 1, said coupling element being a double-thread worm.

* * * * *